United States Patent
Takagi et al.

(10) Patent No.: US 10,837,602 B2
(45) Date of Patent: Nov. 17, 2020

(54) HYDROGEN STORAGE TANK

(71) Applicant: JFE STEEL CORPORATION, Tokyo (JP)

(72) Inventors: Shusaku Takagi, Kawasaki (JP); Akihide Nagao, Kawasaki (JP); Mitsuo Kimura, Kawasaki (JP); Nobuyuki Ishikawa, Kawasaki (JP); Toshio Takano, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 14/786,707

(22) PCT Filed: Apr. 24, 2014

(86) PCT No.: PCT/JP2014/002300
§ 371 (c)(1),
(2) Date: Oct. 23, 2015

(87) PCT Pub. No.: WO2014/174845
PCT Pub. Date: Oct. 30, 2014

(65) Prior Publication Data
US 2016/0091140 A1    Mar. 31, 2016

(30) Foreign Application Priority Data
Apr. 26, 2013   (JP) .................. 2013-093656

(51) Int. Cl.
*F17C 1/06*    (2006.01)
*F17C 1/00*    (2006.01)
*F17C 1/04*    (2006.01)

(52) U.S. Cl.
CPC .............. *F17C 1/06* (2013.01); *F17C 1/00* (2013.01); *F17C 2201/058* (2013.01);
(Continued)

(58) Field of Classification Search
CPC ........ F17C 1/06; F17C 1/11; F17C 2201/058; F17C 2203/0604; F17C 2203/0621;
(Continued)

(56) References Cited

U.S. PATENT DOCUMENTS 6,041,827 A    3/2000   Takahashi
2003/0183638 A1 *  10/2003  Minta ................ F17C 1/002
                                                220/560.13
(Continued)

FOREIGN PATENT DOCUMENTS

EP    1621807    2/2006
JP    0718601    1/1995
(Continued)

OTHER PUBLICATIONS

English language Canadian Office Action for Application No. 2912415, dated Oct. 12, 2016, 5 pages.
(Continued)

*Primary Examiner* — J. Gregory Pickett
*Assistant Examiner* — Niki M Eloshway
(74) *Attorney, Agent, or Firm* — RatnerPrestia

(57) ABSTRACT

A hydrogen storage tank includes a liner layer to store hydrogen and a carbon fiber reinforced plastic layer disposed outside the liner layer. The liner layer is formed from a low-alloy steel, and the carbon fiber forming the carbon fiber reinforced plastic layer is a pitch based carbon fiber.

7 Claims, 4 Drawing Sheets

(52) U.S. Cl.
CPC ............... *F17C 2203/0604* (2013.01); *F17C 2203/066* (2013.01); *F17C 2203/0621* (2013.01); *F17C 2203/0639* (2013.01); *F17C 2203/0648* (2013.01); *F17C 2203/0663* (2013.01); *F17C 2203/0675* (2013.01); *F17C 2209/2154* (2013.01); *F17C 2209/2163* (2013.01); *F17C 2209/225* (2013.01); *F17C 2221/012* (2013.01); *F17C 2223/0123* (2013.01); *F17C 2223/036* (2013.01); *F17C 2260/011* (2013.01); *F17C 2260/012* (2013.01); *F17C 2270/0168* (2013.01); *F17C 2270/0184* (2013.01); *Y02E 60/321* (2013.01)

(58) Field of Classification Search
CPC ...... F17C 2203/0639; F17C 2203/0648; F17C 2203/066; F17C 2203/0663; F17C 2203/0675; F17C 2209/2154; F17C 2209/2163; F17C 2209/225; F17C 2221/012; F17C 2223/0123; F17C 2223/036; F17C 2260/011; F17C 2260/012; F17C 2270/0168; F17C 2270/227; F17C 2270/0184; Y02E 60/321
USPC .................. 220/590, 560.1, 586, 588, 589
See application file for complete search history.

(56) References Cited

U.S. PATENT DOCUMENTS

| | | | |
|---|---|---|---|
| 2006/0099366 A1 | 5/2006 | Takemoto | |
| 2007/0039967 A1* | 2/2007 | Oshima | F17C 11/005 220/581 |
| 2008/0127654 A1* | 6/2008 | Darling | F17C 7/02 62/50.2 |
| 2008/0277036 A1* | 11/2008 | Johansen | B21C 37/0811 148/689 |
| 2009/0020537 A1* | 1/2009 | Darling, IV | F17C 5/02 220/560.05 |
| 2009/0236349 A1* | 9/2009 | Mueller | F17C 1/06 220/590 |
| 2009/0285713 A1 | 11/2009 | Omura | |
| 2011/0168726 A1* | 7/2011 | Silva Vieira | F17C 1/16 220/590 |
| 2013/0220479 A1* | 8/2013 | Luo | F17C 1/00 141/4 |
| 2015/0292677 A1* | 10/2015 | Curless | B29C 61/006 206/0.6 |

FOREIGN PATENT DOCUMENTS

| | | |
|---|---|---|
| JP | 10296910 | 11/1998 |
| JP | 2004176898 | 6/2004 |
| JP | 2005213534 | 8/2005 |
| JP | 2005337394 | 12/2005 |
| JP | 2008164114 | 7/2008 |
| JP | 2009024225 | 2/2009 |
| JP | 2009293799 | 12/2009 |
| JP | 2010037655 | 2/2010 |
| WO | 2004051138 | 6/2004 |

OTHER PUBLICATIONS

International Search Report for International Application No. PCT/JP2014/002300 dated Aug. 5, 2014.
Extended European Search Report dated Mar. 14, 2016 for European Application No. 14788687.3, 9 pages.
Dueren C., "Fiber-reinforced steel pressure vessels—a more economical solution for the transport of hydrogen," Jun. 15, 1992, pp. 105-111, 163, vol. 112, No. 6, Steel and Iron, Dusseldorf, DE (Partial translation).
European Communication for European Application No. 14 788 687.3, dated Sep. 13, 2017, 6 pages.
Naito, K., et al., "Tensile properties of ultrahigh strength PAN-based, ultrahigh modulus pitch-based and high ductility pitch-based carbon fibers," Nov. 7, 2007, pp. 189-195, Carbon 46, Retrieved from the Internet: URL:www.elsevier.com/locate/carbon [retrieved on Aug. 30, 2017].

* cited by examiner

HYDROGEN STORAGE TANK

CROSS REFERENCE TO RELATED APPLICATIONS

This is the U.S. National Phase application of PCT/JP2014/002300, filed Apr. 24, 2014, which claims priority to Japanese Patent Application No. 2013-093656, filed Apr. 26, 2013, the disclosures of these applications being incorporated herein by reference in their entireties for all purposes.

TECHNICAL FIELD OF THE INVENTION

The present invention relates to a hydrogen storage tank to store high pressure hydrogen.

BACKGROUND OF THE INVENTION

Fuel-cell vehicles which solve $CO_2$ emitting problems and which can solve an energy issue are expected as new automobiles in the future. It is necessary that storage tanks for hydrogen, in the case of being mounted on these fuel-cell vehicles, satisfy both conditions of high strength and lightness and, in addition, prevent leakage of hydrogen. Consequently, as for these on-board storage tanks, storage tanks in which cylinder liners formed from metals, e.g., aluminum alloys, exhibiting low possibility of hydrogen embrittlement or resins are wound with carbon fibers have been previously proposed (refer to, for example, Patent Literature 1).

Now, the storage tanks to store hydrogen include not only those for fuel-cell vehicles but also hydrogen storage tanks disposed in hydrogen-filling stations to supply hydrogen to the fuel-cell vehicles. There is no need to pursue the lightness in the case of the hydrogen storage tanks in contrast to the on-board storage tanks. Therefore, a hydrogen storage tank formed entirely from a steel product has been proposed (refer to, for example, Patent Literature 2).

Also, a FRP cylinder using Cr—Mo steel liner for storing high pressure hydrogen gas has been proposed, where the outer circumference of the Cr—Mo steel liner is covered with a FRP (fiber-reinforced plastic) and, thereby, the fatigue crack growth rate in a high pressure hydrogen environment is improved (refer to, for example, Patent Literature 3).

CITATION LIST

Patent Literature

PTL 1: Japanese Unexamined Patent Application Publication No. 2009-24225
PTL 2: Japanese Unexamined Patent Application Publication No. 2010-37655
PTL 3: Japanese Unexamined Patent Application Publication No. 2009-293799

SUMMARY OF THE INVENTION

By the way, it is necessary that the hydrogen storage tank to store hydrogen in the hydrogen-filling station supply hydrogen to many fuel-cell vehicles. This hydrogen storage tank has to store hydrogen at a high pressure as compared with the pressure of the on-board storage tank and hydrogen filling number is overwhelmingly large. Therefore, severe safety regulation is applied to the hydrogen storage tank as compared with the on-board storage tank.

However, there are problems that the weight increases and, in addition, the cost increases to satisfy the above-described safety regulation of the hydrogen-filling station by using the storage tanks of Patent Literatures 1 to 3. That is, in the case of the storage tank of Patent Literature 1, in which a liner, e.g., aluminum alloy, is wound with carbon fibers, thick coverage with carbon fiber is necessary, so that the cost increases. Also, in the case of the storage tank of Patent Literature 2 formed entirely from a steel product, the steel product has a hydrogen embrittlement problem, and it is necessary that the steel product be set to have a large thickness. Consequently, the weight increases and, in addition, the cost increases. Meanwhile, in the case where a Cr—Mo steel having a specific component system is used as the material for liner layer, as described in Patent Literature 3, the raw material cost increases and, thereby, there is a problem that the storage tank cost increases. Also, in the case where the steel liner is covered with the polyacrylonitrile based carbon fiber used in Patent Literature 3 as well, thick coverage with the carbon fiber is necessary, so that the cost increases. Alternatively, in the case where the cost is controlled appropriately, there is a problem that fracture occurs before the filling number required of the hydrogen storage tank for hydrogen-filling station reaches 100,000 times.

Aspects of present invention solve the above-described issues and it is an object to provide an inexpensive hydrogen storage tank while the safety is ensured.

A hydrogen storage tank according to aspects of the present invention includes a liner layer to store hydrogen and the above-described carbon fiber reinforced plastic layer covering the outer circumference of the above-described liner layer, wherein the above-described liner layer is formed from a low-alloy steel and the above-described carbon fiber reinforced plastic layer is formed from pitch based carbon fibers. The details are as described below.

[1] A hydrogen storage tank to store hydrogen, including a liner layer and a carbon fiber reinforced plastic layer disposed on the outside of the above-described liner layer,
wherein the above-described liner layer is formed from a low-alloy steel, and
the above-described carbon fiber reinforced plastic layer is formed from pitch based carbon fibers and a resin.
[2] The hydrogen storage tank according to the item [1], wherein the Young's modulus of the carbon fiber of the above-described carbon fiber reinforced plastic layer is 400 GPa or more.
[3] The hydrogen storage tank according to the item [1] or the item [2], wherein the above-described liner layer is formed from any one of a chrome molybdenum steel, a nickel-chrome-molybdenum steel, a manganese chrome steel, a manganese steel, and a boron-added steel.
[4] The hydrogen storage tank according to any one of the items [1] to [3], wherein the design factor of the generated stress of the above-described liner layer is 2.5 or more.
[5] The hydrogen storage tank according to any one of the items [1] to [4], wherein the generated stress of the above-described liner layer is designed to be less than or equal to the fatigue fracture critical stress, where the number of cycles is 100,000 times at the hydrogen pressure at which the hydrogen storage tank is used.
[6] The hydrogen storage tank according to any one of the items [1] to [5], wherein the fatigue fracture critical stress of the above-described liner layer is 250 MPa or more, where the number of cycles is 100,000 times at the hydrogen pressure of 82 MPa.
[7] The hydrogen storage tank according to any one of the items [1] to [6], wherein the above-described liner layer is subjected to auto-frettage.

[8] The hydrogen storage tank according to any one of the items [1] to [7], wherein the above-described liner layer is formed from a seamless steel tube produced by piercing a high-temperature material during rolling.

[9] The hydrogen storage tank according to any one of the items [1] to [8], wherein the outer circumference surface of the above-described liner layer is subjected to powder coating.

According to the hydrogen storage tank of aspects of the present invention, the low-alloy steel is used as the liner layer and the pitch based carbon fibers are used for the carbon fiber reinforced plastic layer, so that a lightweight inexpensive hydrogen storage tank can be provided while the compatibility between an allowable minimum burst pressure and a fatigue cycle life required of the hydrogen storage tank to store hydrogen is ensured.

DETAILED DESCRIPTION OF PREFERRED EMBODIMENTS OF THE INVENTION

Preferred embodiments of the hydrogen storage tank according to aspects of the present invention will be described below in detail with reference to the drawings. In this regard, the embodiment described below is a specific preferred example of the present invention and, therefore, various technically preferable limitations are imposed. However, the scope of the present invention is not limited to these embodiments unless it is specified in the following explanations that the present invention is limited.

[Outline of Hydrogen-Filling Station]

Figure 1:
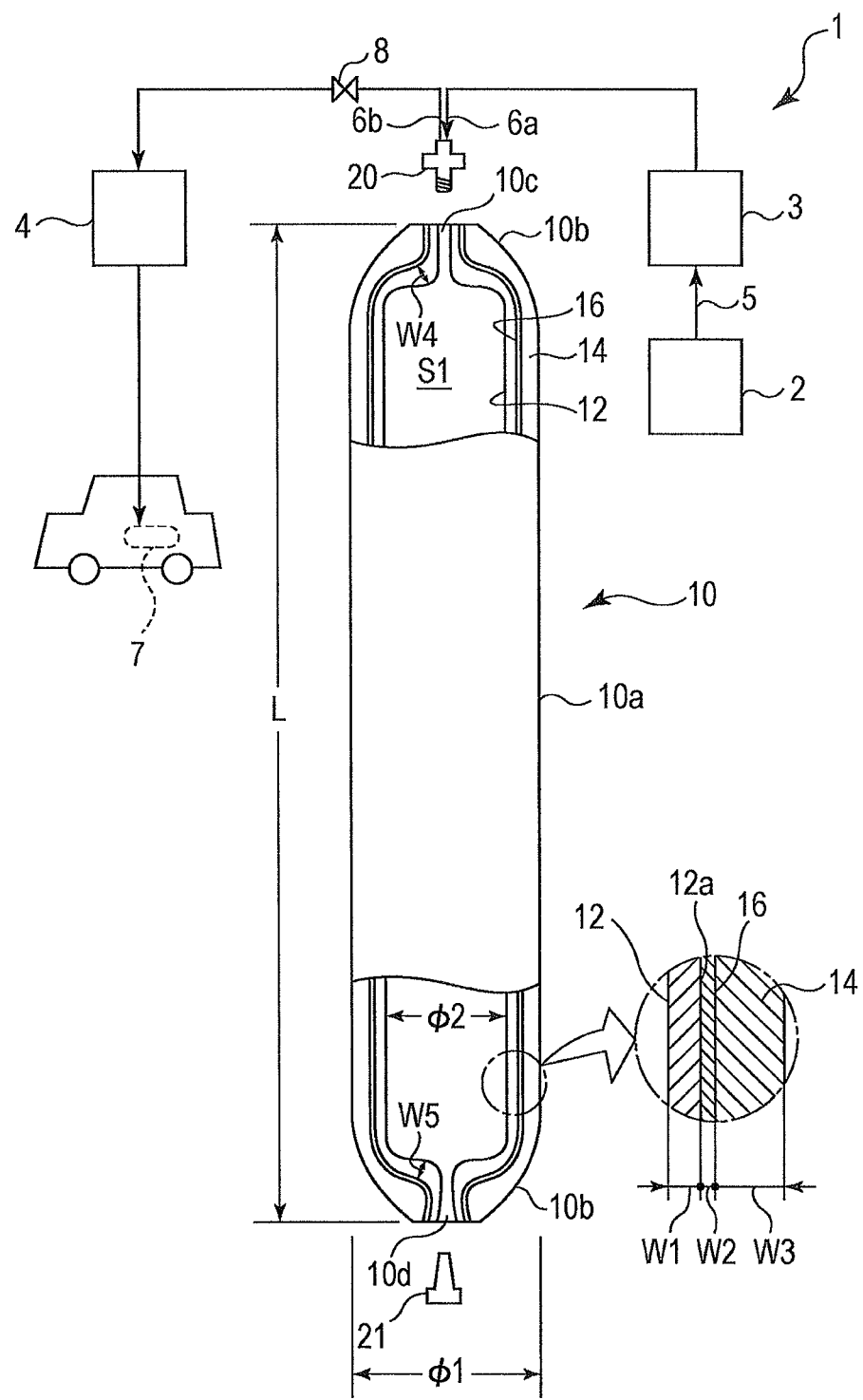
FIG. 1 is a configuration diagram of a hydrogen-filling station including a hydrogen storage tank according to a preferred embodiment of the present invention.

FIG. 1 is a configuration diagram of a hydrogen-filling station 1 including a hydrogen storage tank 10. In this regard, for the convenience of understanding, in the drawing of the hydrogen storage tank 10, a valve 20 and a boss 21 are shown detached and the half is partially cutaway. As shown in FIG. 1, the hydrogen-filling station 1 includes a curdle 2, a compressor 3, the hydrogen storage tank 10 connected to the compressor 3 through a pipe 6a, and a dispenser 4. The curdle 2 is a supply source of hydrogen, where a plurality of high pressure storage tanks are assembled, and is carried to the hydrogen-filling station 1 after being filled with hydrogen at a separate place.

The compressor 3 is connected to the curdle 2 through a pipe 5 and, in addition, is connected to the hydrogen storage tank 10 through the pipe 6a and the valve 20. Then, the compressor 3 fills hydrogen in the curdle 2 into the hydrogen storage tank 10 side while applying pressure. The hydrogen storage tank 10 is a storage tank to store hydrogen in the inside is connected to the compressor 3 through the above-described valve 20 and, in addition, is connected to the dispenser 4 through a pipe 6b. In this regard, the hydrogen storage tank 10 is laid sideways and is placed on a base in such a way that stress fluctuation does not occur to the extent possible. The dispenser 4 is a discharge device to supply hydrogen stored in the hydrogen storage tank 10 to a hydrogen tank 7 mounted on a fuel electric vehicle and the supply of hydrogen to the hydrogen tank 7 is adjusted with a valve 8 disposed at some midpoint of the pipe 6b. In this regard, on the dispenser 4 side, hydrogen is cooled by a cooler called a pre-cooler, although not shown in the drawing, so that the cooled hydrogen is supplied to the hydrogen tank 7 mounted on the fuel-cell vehicle.

Then, in the case where hydrogen is filled into the hydrogen storage tank 10 disposed in the hydrogen-filling station 1, hydrogen in the curdle 2 is supplied into the hydrogen storage tank 10 through the pipe 6a and the valve 20 while filling pressure is applied by the compressor 3. On the other hand, in the case where hydrogen is supplied from the hydrogen storage tank 10 to the hydrogen tank 7, hydrogen in the hydrogen storage tank 10 is supplied from the dispenser 4 to the hydrogen tank 7 through the pipe 6b and the valve 8. As described above, the hydrogen storage tank 10 is placed and fixed in the hydrogen-filling station 1 and performs the functions of storing hydrogen, which is supplied from the compressor 3, once at a high pressure and supply the hydrogen in succession to the dispenser 4 side.

[Hydrogen Storage Tank 10]

Next, the hydrogen storage tank 10 will be described in detail. The hydrogen storage tank 10 is, for example, in the shape having a large length in one direction and is formed having a length L of 2,000 mm, an outside diameter φ1 of 500 mm, an inside diameter φ2 of 300 mm, and a capacity of 140 L. In this regard, the capacity and each dimension of the hydrogen storage tank 10 are not limited to those described above and can be set appropriately in accordance with an installation location, required performance, and the like.

Also, the hydrogen storage tank 10 has a cylindrical portion 10a formed into the shape of a cylinder and shoulders 10b and 10b disposed at both ends of the cylindrical portion 10a, and an internal space S1 is formed in the inside thereof. The hydrogen storage tank 10 has a so-called double boss structures in which holes 10c and 10d are opened at both ends. The valve 20 and the boss 21 are fitted to these holes. The valve 20 is fixed to one hole 10c by screw together or the like, and hydrogen is supplied and released through the valve 20. The boss 21 is inserted into the other hole 10d to seal. In this regard, it is preferable that the valve 20 and the boss 21 be made from a metal in such a way as to also serve as earths to discharge, as an electric current, a static electrical charge accumulated in the liner layer 12 to the ground.

The hydrogen storage tank 10 includes the liner layer 12 to store hydrogen inside and a carbon fiber reinforced plastic layer 14 covering the outside circumference of the liner layer 12. The liner layer 12 is disposed on the entire inner surface and, as is shown in a partially magnified view surrounded by alternate long and short dashed lines in FIG. 1, the thickness W1 thereof in the cylindrical portion 10a is about 20 to 60 mm. The liner layer 12 in the shoulder 10b is curved and the thicknesses W4 and W5 thereof are larger than the thickness W1 thereof in the cylindrical portion 10a because a stress is concentrated easily in the shoulder 10b as compared with in the cylindrical portion 10a. Furthermore, it is preferable that the thickness W4 around the valve 20 serving as a supply hole and a release hole of hydrogen be larger than the thickness W5 around the boss 21 to simply seal the hole 10d, and it is preferable that the thicknesses of the liner layer 12 dimensionally satisfy W1<W5<W4.

Meanwhile, it is preferable to make allowance for the thickness of the liner layer 12 in advance in such a way that a gas barrier property and strength of the storage tank can be maintained even if a microcrack is generated in the inner surface and the crack portion is removed by cutting and polishing. Consequently, it is possible to prevent growth of the crack while the role of the liner layer 12 is ensured by cutting the inner surface including the crack of the liner layer 12, for example, in a periodic inspection.

The liner layer 12 is formed from a low-alloy steel and, in particular, is formed from any one of a chrome molybdenum steel JIS SCM steel, a nickel-chrome-molybdenum steel JIS SNCM steel, a manganese chrome steel JIS SMnC steel, a manganese steel JIS SMn steel, and a boron-added steel N28CB, N36CB, or N46CB. The liner layer 12 is formed from more preferably a chrome molybdenum steel relatively inexpensively available among the low-alloy steels. For example, a chrome molybdenum steel (SCM435) contains C: 0.33 to 0.38 percent by mass, Si: 0.15 to 0.35 percent by mass, Mn: 0.60 to 0.90 percent by mass, P: 0.040 percent by mass or less, S: 0.030 percent by mass or less, Cr: 0.90 to 1.20 percent by mass, and Mo: 0.15 to 0.30 percent by mass.

Figure 2:
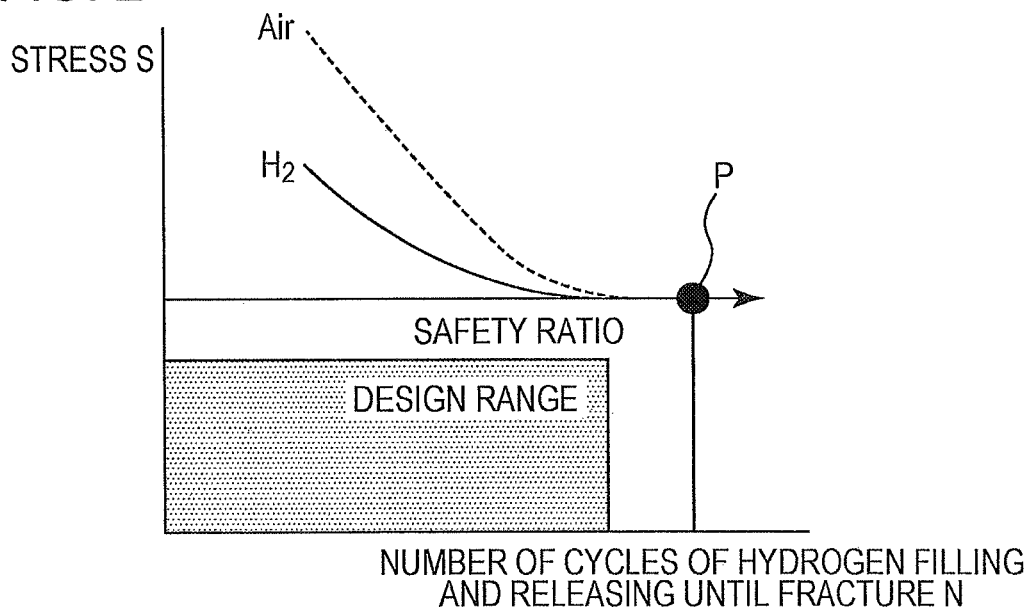
FIG. 2 is a graph of an S-N curve indicating the relationship between the stress S and the number of cycles of hydrogen filling and releasing until fracture N of a chrome molybdenum steel which is a low-alloy steel.

In addition, it is necessary that in a hydrogen environment, fracture due to hydrogen embrittlement be prevented by designing the generated stress of the liner layer 12 of the hydrogen storage tank 10 to be less than or equal to the fatigue fracture critical stress. FIG. 2 shows an S-N curve indicating the relationship between the stress S and the number of cycles of hydrogen filling and releasing until fracture N of a chrome molybdenum steel which is a low-alloy steel. As shown in FIG. 2, in a hydrogen environment, there is a fatigue limit P, where fatigue fracture does not occur at the stress of P or less, (fatigue fracture critical stress). The generated stress of the chrome molybdenum steel constituting the liner layer 12 is designed to be the fatigue limit P or less. Specifically, for example, the fatigue limit P of the chrome molybdenum steel in the hydrogen environment is about 40% of the tensile strength thereof. Here, it is preferable that the upper limit of the allowable stress (generated stress of liner) be 25% of the tensile strength in consideration of the safety ratio.

Figure 3:
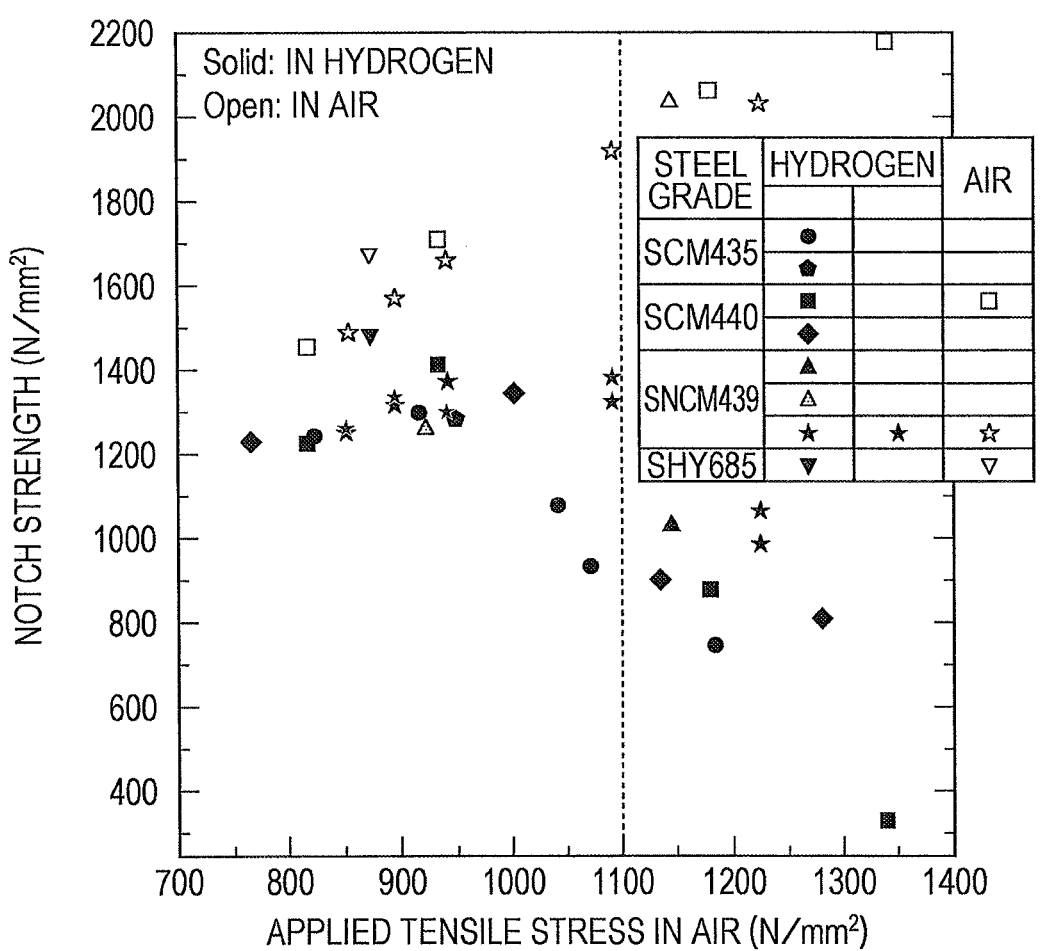
FIG. 3 is a graph indicating the relationship between the applied tensile stress in the air and the notch strength of a low-alloy steel in the air and in the hydrogen environment.

Furthermore, in the case where hydrogen is stored in the hydrogen storage tank 10, hydrogen embrittlement of the liner layer 12 has to be taken into consideration. FIG. 3 is a graph indicating the relationship between the notch strength and the tensile strength TS (tension), which is an indicator of hydrogen embrittlement of a chrome molybdenum steel (SCM435 specified in JIS G4053/AISI4135, SCM440 specified in JIS G4053), a nickel-chrome-molybdenum steel (SNCM439 specified in JIS G4053), and a high strength steel (SHY685 specified in JIS G3128), which are low-alloy steels. As shown in FIG. 3 quoted from Non Patent Literature 1 (Final report of NEDO project FY 2006-FY 2010), in the range of tension (=tensile strength TS) in the air of 1,100 MPa or less, there are steel sheets which maintain high notch strength even in hydrogen. However, in the case where the tension is more than 1,100 MPa, the notch strength in hydrogen of every steel grade is extremely reduced. Therefore, the tensile strength TS of the liner layer 12 is preferably 1,100 MPa or less from the viewpoint of hydrogen embrittlement, and less than 950 MPa is more desirable to further ensure safety.

Also, as shown in FIG. 1, a coating 16 is applied to the outer circumference surface 12a of the liner layer 12. Consequently, even when a crack or the like is generated in the carbon fiber reinforced plastic layer 14 serving as a surface layer and water is accumulated at the interface between the liner layer 12 and the carbon fiber reinforced plastic layer 14, rust of the liner layer 12 formed from a steel product can be prevented. Further, this coating 16 is formed by powder coating, where a coating formed from a powder resin is attached to the outer circumference surface 12a and, thereafter, coating film is formed by heat-melting. Consequently, the film thickness can be made uniform, coating which includes no solvent (water) and which suppresses rust can be performed, and the above-described effect of designing the stress amplitude to become less than or equal to the fatigue limit is ensured effectively. In this regard, thermoplastic powder coatings based on vinyl chloride series resin and the like and thermosetting powder coatings based on polyester resins, acrylate resins, epoxy resins, and the like can be used for the powder coating. In aspects of the present invention, the thermosetting powder coatings are used preferably in consideration of heat and the like in hydrogen filling.

The carbon fiber reinforced plastic layer 14 is a layer to ensure the predetermined pressure resistance (mechanical strength) of the hydrogen storage tank 10 and covers the entire outer circumference surface 12a of the liner layer 12, where the thickness W3 in the case shown in FIG. 1 is set to be about 45 mm. This carbon fiber reinforced plastic layer 14 is a composite material, in which the carbon fiber is used as the reinforcing material and this is impregnated with a resin to improve the strength, and is called CFRP (carbon-fiber-reinforced plastic).

In particular, the carbon fiber reinforced plastic layer 14 is formed from pitch based carbon fibers and a resin. In this regard, it is enough that the carbon fiber reinforced plastic layer 14 includes pitch based carbon fibers composed of continuous fibers, so that mesophase pitch-based carbon fibers may be employed or isotropic pitch-based carbon fibers may be employed. In this regard, more preferably, the mesophase pitch-based carbon fibers are used because continuous fibers are produced easily. As for the resin, thermosetting resins are used preferably and epoxy resins are further preferable.

This pitch based carbon fiber is produced from coal-tar pitch or petroleum pitch serving as a raw material, as described below. Initially, a refined raw material pitch is heated and the viscosity and the molecular weight are adjusted in such a way that spinning can be performed. Subsequently, the resulting spinning pitch in the state of being heated to 300° C. to 400° C. is allowed to pass through a nozzle and, thereby, fibers having a diameter of about 10 μm are formed. In this state, a treatment called infusibilizing treatment is applied in order to add oxygen to facilitate bridge bond, and carbonization is performed in an inert atmosphere at 1,500° C. to 2,500° C., so that pitch based carbon fibers are produced.

The pitch based carbon fiber has a large elastic modulus as compared with PAN based carbon fiber because the fiber cross-section includes folded plate-shaped crystals, these crystals are regularly arranged and assembled along the fiber direction and, thereby, the orientation is enhanced. As for such pitch based carbon fibers, products of, for example, Mitsubishi Plastics, Inc., Nippon Graphite Fiber Corporation, KUREHA CORPORATION, OSAKA GAS CHEMICALS, can be utilized.

In addition, the volume content of the carbon fibers in the carbon fiber reinforced plastic layer can be determined on the basis of Japanese Industrial Standards JIS K 7075 (1991) and is usually preferably within the range of 50% to 80%.

As described above, a lightweight hydrogen storage tank 10 satisfying the basic performance can be provided inexpensively by using a low-alloy steel for the liner layer 12 and using pitch based carbon fibers for the carbon fiber reinforced plastic layer 14. That is, the strength to endure the filling pressure when hydrogen is filled and the fatigue cycle life to respond to pressure and decompression cycles are required as the basic performance of the hydrogen storage tank 10. In the case where the strength is insufficient, the hydrogen storage tank 10 may burst and in the case where the fatigue strength is insufficient, leakage and the like may occur because of fatigue crack. In particular, in the case of a hydrogen storage tank disposed in the hydrogen-filling station 1, for example, the fatigue strength corresponding to pressure and decompression cycles of 100,000 times or more is required.

One feature of the present invention is to use the pitch based carbon fiber as the carbon fiber. The carbon fibers include the pitch based carbon fiber and the PAN based carbon fiber. The PAN based carbon fiber has been used for various applications, e.g., aircraft, and has spread generally. For example, the PAN based carbon fiber is used in Patent Literature 3. On the other hand, the pitch based carbon fiber is a carbon fiber which has just been developed. The pitch based carbon fiber has features that the elastic modulus (may be referred to as Young's modulus) is large and, therefore, the stiffness property is high, although the strength is small as compared with the strength of the PAN based carbon fiber. For example, the Young's modulus of the pitch based carbon fiber is 400 to 1,000 GPa, whereas the Young's modulus of the PAN based carbon fiber is about 230 GPa, so that the Young's modulus of the pitch based carbon fiber is higher (is highly stiff) than the Young's modulus of the PAN based carbon fiber. On the other hand, the tensile strength TS of the pitch based carbon fiber is about 3,000 to 4,000 GPa, whereas the tensile strength TS of the PAN based carbon fiber is about 5,000 GPa, so that the PAN based carbon fiber has excellent strength as compared with the strength of the pitch based carbon fiber. These tensile strength and Young's modulus can be adjusted by the method for manufacturing the carbon fiber.

In the case where the PAN based carbon fiber is used in such a way as being wound around a steel liner or an aluminum alloy liner, a large amount of the carbon fiber has to be used for satisfying the above-described two types of basic performance required of the hydrogen storage tank 10 because of the stiffness property (elastic modulus or Young's modulus) of the carbon fiber being the same level of the stiffness property of the steel, so that the production cost increases considerably. In the case of the amount of carbon fiber at which the production cost can be set in an appropriate range, pressure and decompression cycles until fracture are about 10,000 times, so that it may be possible to use for an on-board hydrogen storage tank. However, the use for the hydrogen-filling station is not allowable.

So, it was found that a lightweight hydrogen storage tank 10 satisfying both requirements for the strength capable of enduring the filling pressure in storing hydrogen and the stiffness property satisfying pressure and decompression cycles of 100,000 time or more was able to be produced inexpensively by allowing the liner layer 12 formed from the low-alloy steel and the carbon fiber reinforced plastic layer 14 formed from highly stiff pitch based carbon fibers to collaborate with each other.

Further, in this regard, the elongation of the pitch based carbon fiber is 1% or less. In the case where a steel is used for the liner layer 12, the amount of deformation of the liner layer 12 when hydrogen is stored at a high pressure can be reduced because the stiffness property of the steel is high. Therefore, it was found that the pitch based carbon fiber exhibiting such a small elongation was able to be used.

Figure 4:
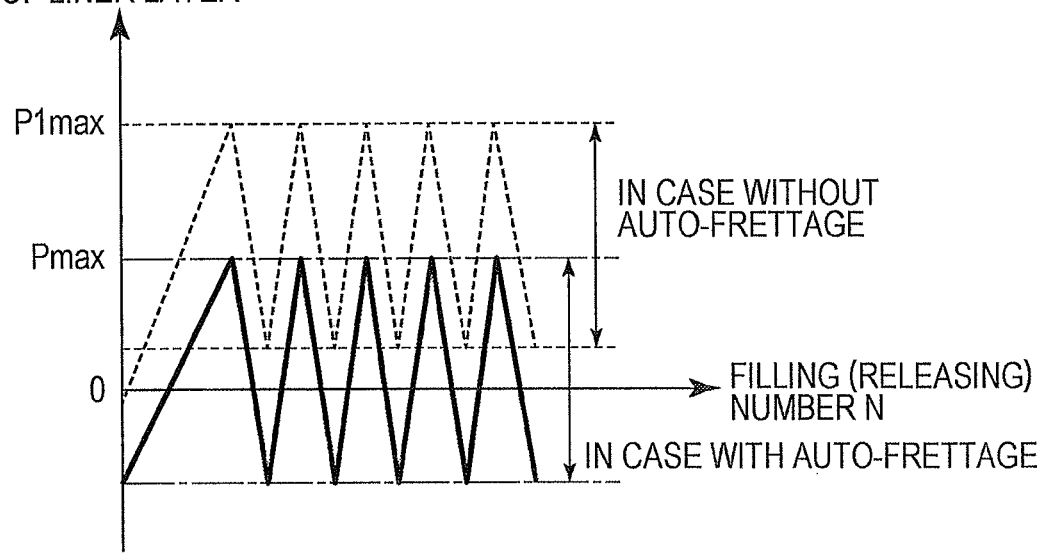
FIG. 4 is a graph indicating pressure fluctuation generated in a liner layer 12 of a hydrogen storage tank 10 versus the filling (releasing) number N.

Meanwhile, the liner layer 12 may be subjected to auto-frettage. FIG. 4 is a schematic diagram indicating the generated stress of the liner layer 12 of the hydrogen storage tank 10 versus the filling (releasing) number N. As shown in FIG. 4, in the case without auto-frettage, the generated stress becomes a maximum value P1max, whereas in the case with auto-frettage, the generated stress becomes a maximum value Pmax (<P1max), so that the maximum value of the stress is reduced. In this manner, the maximum generated stress of the liner layer 12 can be substantially reduced by subjecting the liner layer 12 to auto-frettage and, thereby, generating a compressive residual stress.

Figure 5:
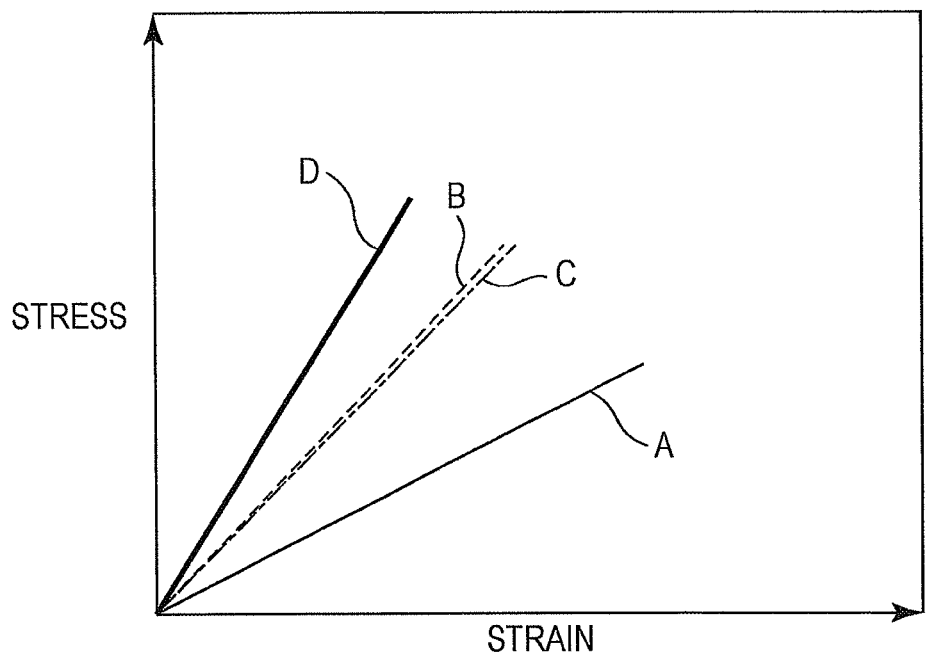
FIG. 5 is a graph comparing the relationships between the strain and the stress of carbon fibers and metals (the angle of inclination of each line indicates a stiffness property).

Here, even in the case where the liner layer 12 is formed from the low-alloy steel, the auto-frettage of the liner layer 12 can be realized on the basis of a simple configuration by using the pitch based carbon fiber for the carbon fiber reinforced plastic layer 14. Specifically, FIG. 5 is a schematic diagram comparing the relationships between the strain and the stress of carbon fibers and metals (the inclination of each line indicates an elastic modulus (Young's modulus)). In this regard, FIG. 5 shows the results of a tensile test of specimens having the same outside shape and thickness, performed in an elastic deformation region, A represents the stiffness property of an aluminum alloy, B represents the stiffness property of a PAN based carbon fiber, C represents the stiffness property of a steel product, and D represents the stiffness property of a pitch based carbon fiber.

As shown in FIG. 5, the stiffness property (elastic modulus) of the PAN based carbon fiber B, where the raw material is polyacrylonitrile, is large as compared with the stiffness property of the aluminum alloy A. Therefore, in the case where the aluminum alloy A is made into the liner layer 12, the PAN based carbon fiber B is frequently used as the carbon fiber serving as the surface layer. However, in the case where the liner layer 12 is formed from, for example, the chrome molybdenum steel (C) as described above, since the chrome molybdenum steel (C) and the PAN based carbon fiber B have nearly the same stiffness property (elastic modulus) (the Young's modulus of the chrome molybdenum steel is about 210 GPa), even when the PAN based carbon fiber B is wound around the outer circumference surface 12a of the chrome molybdenum steel (C), the pressure resistance of the hydrogen storage tank 10 is hardly enhanced. Also, even when the auto-frettage is performed, the effect thereof is small.

Then, the pitch based carbon fiber D having a stiffness property larger than the stiffness property of the liner layer 12 formed from the chrome molybdenum steel (C) is used for the carbon fiber reinforced plastic layer 14 (the elastic modulus (Young's modulus) of the pitch based carbon fiber D is about 400 to 1,000 GPa). It is noted that the pitch based carbon fiber has an elastic modulus (Young's modulus) about 3 times higher than that of the chrome molybdenum steel, the pitch based carbon fiber is used for the carbon fiber reinforced plastic layer 14 and, thereby, the effect of the auto-frettage can be exerted to a large extent.

[Method for Manufacturing Hydrogen Storage Tank 10]

Figure 6:
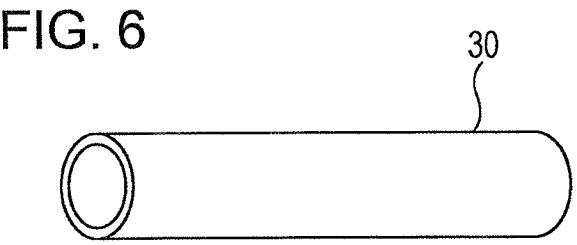
FIG. 6 is a schematic diagram showing a seamless steel tube which is part of a method for manufacturing the hydrogen storage tank shown in FIG. 1.

Next, a preferable method for manufacturing the above-described hydrogen storage tank 10 will be described with reference to FIG. 6 and FIG. 7. Initially, as shown in FIG. 6, a seamless steel tube 30 having a tubular shape with no seam is formed (Step 1: seamless steel tube forming step). Specifically, the seamless steel tube 30 is formed by adopting a so-called Mannesmann mill process in which a steel ingot called a billet in the shape of a round bar is heated to serve as a high-temperature material and a hollow pipe is formed by piercing the center of the high-temperature material with a tool while the high-temperature material is rolled with a mandrel mill. Meanwhile, the liner layer 12 shown in FIG. 1 is formed from a seamless steel tube with no seam and exhibits a uniform stiffness property in the circumferential direction and, thereby, a strong layer resistant to internal pressure and torsion can be formed. Then, in this seamless steel tube, there can be no case where the stress is concentrated on a seam, e.g., weld, so that the above-described effect of designing the generated stress of the liner layer 12 to be less than or equal to the fatigue fracture critical stress is ensured effectively. In this regard, the method for manufacturing the seamless steel tube is not particularly specified. It is preferable that mass production be made possible by performing rolling while the high-temperature material is pierced during the rolling and, thereby, an inexpensive liner layer 12 be formed.

Figure 7:
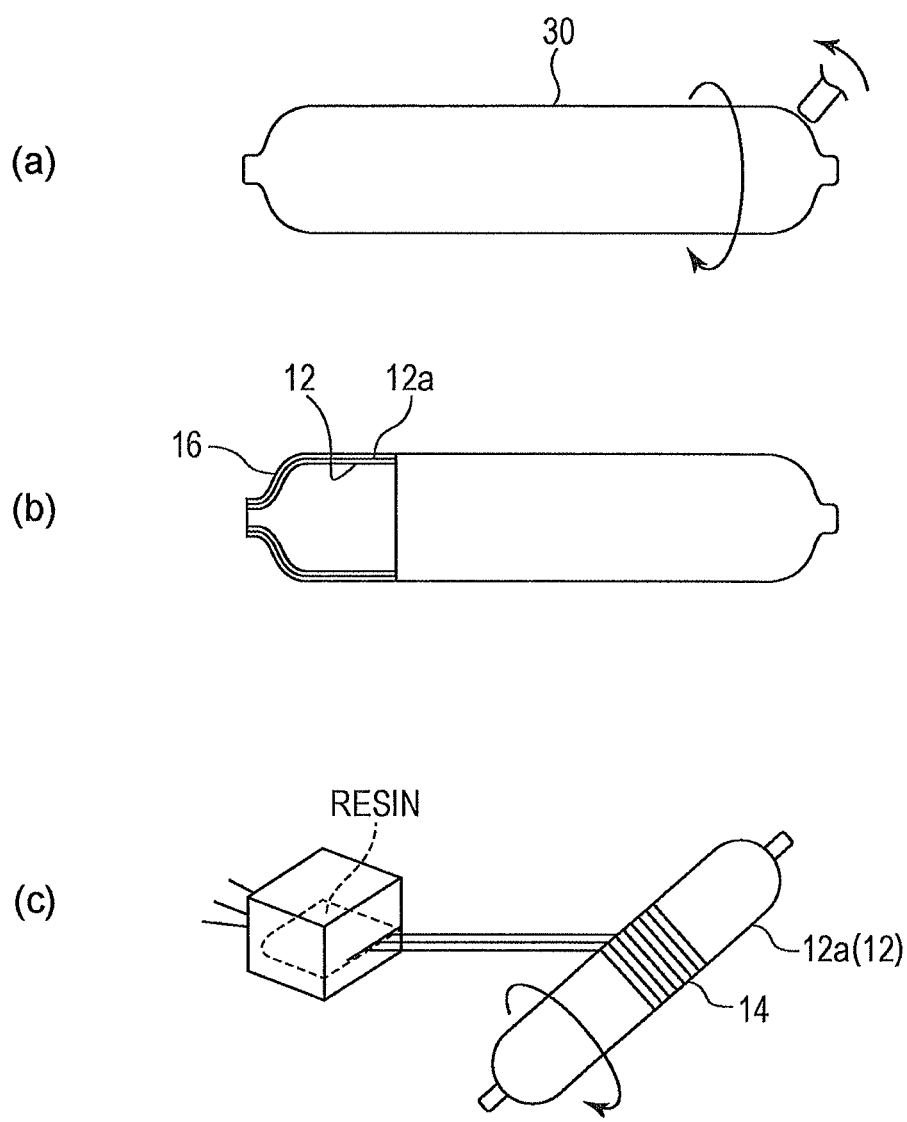
FIG. 7 is a diagram showing a spinning step (a), a coating step (b), and a carbon fiber reinforced plastic layer forming step (c) which are parts of a method for manufacturing the hydrogen storage tank shown in FIG. 1.

Subsequently, as shown in FIG. 7 (a), spinning is performed while the seamless steel tube 30 is rotated, so that a portion serving as a shoulder 10b is formed (Step 2: spinning step). Thereafter, so-called quenching and tempering are performed to obtain hardness and toughness (Step 3: heat treatment). Then, barrel polishing of the storage tank inner surface is performed (Step 4: polishing step). In this regard, in the present embodiment, in order to polish the inside of a large storage tank, a bar-shaped or band-shaped nonwoven abrasive material is used as an abrasive material, and this is inserted through the mouth of the storage tank so as to be brought into contact with the inner surface of the storage tank. Subsequently, an electrode is disposed on this abrasive material and polishing is performed while rotating about the central axis of the storage tank in the energized state. Consequently, growth of crack, where fine unevenness of the inner surface of the liner layer 12 serves as a starting point, can be prevented. Then, after the polishing is performed, cleaning by nitrogen gas is performed while the storage tank is vibrated to remove polishing residue and the like (impulsive excitation and cleaning by nitrogen gas method), so that the liner layer 12 shown in FIG. 1 is completed.

Next, as shown in FIG. 7 (b), the coating 16 (refer to FIG. 1) is applied to the outer circumference surface 12a of the liner layer 12 (Step 5: coating step). The coating in the present production method is powder coating, and coating is performed by an electrostatic spray coating process. The coating is attached to the outer circumference surface 12a by performing spraying in the state in which, for example, the liner layer 12 is plus-charged and the coating side is minus-charged. Thereafter, heating is performed in a baking furnace for the purpose of degassing and smoothing, cooling is performed and, thereby, the coating film is completed.

Next, as shown in FIG. 7 (c), winding wire of the pitch based carbon fiber impregnated with a resin, e.g., an unsaturated polyester resin or an epoxy resin, on the outer circumference surface 12a (specifically a coating film surface) of the liner layer 12 is performed and, thereafter, the resin is subjected to thermal curing, so that the carbon fiber reinforced plastic layer 14 shown in FIG. 1 is formed (Step 6: carbon fiber reinforced plastic layer forming step). On this occasion, as for the cylindrical portion 10a of the liner layer 12, it is preferable that only hoop winding, in which the pitch based carbon fiber exhibiting a large stiffness property in the fiber direction (longitudinal direction) is wound along the circumferential direction, be employed from the viewpoint of cost reduction and, thereby, bulge in the circumferential direction of the liner layer 12 can be prevented. However, there is no problem in covering the entire liner layer 12 with the pitch based carbon fiber by combining helical winding and hoop winding. In addition, it becomes possible to perform auto-frettage after winding with the carbon fiber reinforced plastic layer 14.

According to the above-described embodiment, the lightweight inexpensive hydrogen storage tank 10 satisfying the basic performance required for storing hydrogen can be provided by including the liner layer 12, which is formed from a steel product and which stores hydrogen, and the carbon fiber reinforced plastic layer 14, which is formed from the pitch based carbon fibers and which covers the outer circumference of the liner layer 12. In particular, in the case where the generated stress of the liner is specified to be less than or equal to the fatigue fracture critical stress of the liner layer 12, where the number of cycles is 100,000 times at the operating hydrogen pressure, and the Young's modulus of the carbon fiber of the carbon fiber reinforced plastic layer 14 is 400 GPa or more, every basic performance required of the hydrogen storage tank 10 disposed in the hydrogen-filling station 1 can be satisfied. In this regard, the upper limit of the Young's modulus is about 1,000 GPa.

Also, in order to specify the generated stress of the liner to be less than or equal to the fatigue fracture critical stress of the liner layer 12, where the number of cycles is 100,000 times at the operating hydrogen pressure, the design factor is specified to be 2.5 or more and 4.5 or less.

In addition, the pitch based carbon fiber has a stiffness property (Young's modulus) larger than the stiffness property of the low-alloy steel, so that even when the low-alloy steel is used for the liner layer 12, the auto-frettage can be performed by the carbon fiber reinforced plastic layer 14 and the elastic deformation range of the hydrogen storage tank 10 can be enlarged.

Also, in the case where the liner layer 12 is formed from the seamless steel tube produced by piercing the high-temperature material while the high-temperature material is subjected to rolling, the seamless steel tube has no junction portion, so that the homogeneity in the circumferential direction is excellent, the characteristics intrinsic to the steel product can be delivered, and the above-described effect of designing the generated stress of the liner layer 12 to be less than or equal to the fatigue fracture critical stress is ensured effectively. Also, mass production of the seamless steel tube on the basis of rolling is made possible and, thereby, a more inexpensive liner hydrogen storage tank 10 can be produced.

Meanwhile, in the case where the coating 16 is applied to the outer circumference surface 12a of the liner layer 12, rust of the liner layer 12 formed from the steel product can be prevented effectively. That is, water may be accumulated at the interface between the carbon fiber reinforced plastic layer 14 and the liner layer 12 because of, for example, degradation of the carbon fiber reinforced plastic layer 14 exposed to the outside air. Then, rust of the liner layer 12 may be generated in contrast to the aluminum alloy and the resin in the related art. However, rust can be prevented by applying the coating to the outer circumference surface 12a of the liner layer 12. Also, this coating is powder coating and, therefore, the film thickness can be made uniform and coating which includes no solvent (water) and which suppresses rust can be achieved. In this manner, the above-described effect of designing the generated stress of the liner layer 12 to be less than or equal to the fatigue fracture critical stress is ensured effectively.

The embodiment according to the present invention is not limited to the above-described embodiment. For example, the case where the carbon fiber reinforced plastic layer 14 is formed from the pitch based carbon fiber is shown as an example. However, the surface thereof may be coated with GFRP in which glass fibers serve as reinforcing fibers. Also, the case where the hydrogen storage tank 10 is disposed in the hydrogen-filling station 1 is shown in FIG. 1 as an example, although disposition and the like may be performed at places other than the hydrogen-filling station 1.

EXAMPLES

Each hydrogen storage tank formed from the liner layer 12 shown in Table 1 and carbon fiber reinforced plastic layer 14 by using the carbon fiber shown in Table 1 was produced. In each case, an epoxy resin, which was a thermosetting resin, was used as the resin of the carbon fiber reinforced plastic layer 14. Meanwhile, the volume content of carbon fiber in the carbon fiber reinforced plastic layer 14 was 60%. As for the winding way of the carbon fiber, so-called type 2 storage tanks, in which only the cylindrical portion 10a was wound by hoop winding, were produced. Partly, so-called type 3 storage tanks, in which end portions besides the cylindrical portion 10a were wound by helical winding, were also produced. In the case where auto-frettage was performed, the water pressure of 210 MPa was applied as for a steel liner, and 166 MPa was applied as for an aluminum alloy liner.

Table 1 described below is a table showing Examples 1 to 7 and Comparative example 7, in which the carbon fiber reinforced plastic layer 14 was formed from the pitch based carbon fiber, and Comparative examples 1 to 6 and Comparative example 8, in which the carbon fiber reinforced plastic layer 14 was formed from the PAN based carbon fiber.

The term "hydrogen pressure" in Table 1 refers to a maximum hydrogen pressure in filling into the resulting hydrogen storage tank. Also, the term "generated stress of liner" refers to a maximum stress generated in the liner layer 12 when hydrogen was filled at 82 MPa before auto-frettage, where the maximum stress was determined on the basis of the thickness of the liner layer 12 and the thickness of the carbon fiber reinforced plastic layer 14. Therefore, in Examples 1 to 7 and Comparative examples 1 to 3, initially, the thickness of the liner layer 12 was determined, the thickness of the carbon fiber reinforced plastic layer, at which a predetermined allowable stress (in Table 1, Generated stress of liner) was generated in the liner layer in the state of being loaded with 82 MPa, was determined by finite element method analysis and, then, the carbon fiber reinforced plastic layer 14 was produced on the basis of that. In Comparative examples 4 to 8, initially, the materials and thicknesses of the liner layer 12 and the carbon fiber reinforced plastic layer 14 were determined and, then, the generated stress of the liner was calculated by the finite element method analysis. The "design factor" was determined by dividing the tensile strength (TS) of the material for the liner layer 12 by the "generated stress of liner".

The term "fatigue limit at hydrogen pressure of 82 MPa" refers to the fatigue fracture critical stress at the number of cycles is 100,000 times, where a round bar type specimen formed to have a parallel portion diameter of 6 mm was prepared from a liner raw material and a fatigue cycle test was performed at the hydrogen pressure of 82 MPa under the condition of the stress ratio of 0.1. The test was performed in conformity with JIS Z2273. The term "fracture results at 100,000 times" refers to presence or absence of fracture of the hydrogen storage tank when sealing of hydrogen into the storage tank up to 82 MPa and releasing are repeated 100,000 times. In this regard, in every case where leakage or fracture occurred, damage of the cylindrical portion 10a was observed. In general, in the case of the storage tank having the shape shown in FIG. 1, the stress generated in both end portions is one-half of the stress generated in the cylindrical portion 10a and fracture occurs from the cylindrical portion 10a. In this regard, the same result is expected in the case where the hydrogen pressure is specified to be 110 MPa.

TABLE 1

| | Material for liner layer | | | | | Liner layer | | | Carbon fiber | | |
|---|---|---|---|---|---|---|---|---|---|---|---|
| Remarks | Metal type | Yield strength YS/ MPa | Tensile strength TS/ MPa | Young's modulus/ GPa | Fatigue limit at hydrogen pressure of 82 MPa*/ MPa | Outside diameter/ mm | Inside diameter/ mm | Thickness/ mm | Type | TS/ MPa | Young's modulus/ GPa |
| Example 1 | SCM435 | 850 | 1000 | 210 | 380 | 406 | 330 | 38 | pitch | 3600 | 620 |
| Example 2 | SCM435 | 850 | 1000 | 210 | 380 | 406 | 330 | 38 | pitch | 3600 | 780 |
| Example 3 | SCM435 | 650 | 800 | 210 | 320 | 406 | 330 | 38 | pitch | 3600 | 620 |
| Example 4 | SNCM439 | 850 | 1000 | 210 | 400 | 406 | 306 | 50 | pitch | 3600 | 620 |
| Example 5 | SNCM439 | 850 | 1000 | 210 | 400 | 406 | 306 | 50 | pitch | 3600 | 620 |
| Example 6 | SCM435 | 650 | 800 | 210 | 320 | 406 | 330 | 38 | pitch | 3600 | 620 |
| Comparative example 1 | SCM435 | 850 | 1000 | 210 | 380 | 406 | 330 | 38 | PAN | 5000 | 230 |
| Comparative example 2 | SCM435 | 650 | 800 | 210 | 320 | 406 | 330 | 38 | PAN | 5000 | 230 |
| Comparative example 3 | 34CrMo44 | 840 | 940 | 210 | 360 | 406 | 399.6 | 3.2 | PAN | 5000 | 230 |
| Comparative example 4 | aluminum alloy A6061 | 300 | 350 | 70 | 100 | 406 | 391.2 | 7.4 | PAN | 5000 | 230 |

TABLE 1-continued

| | | | | | | | | | | | |
|---|---|---|---|---|---|---|---|---|---|---|---|
| Comparative example 5 | SCM435 | 850 | 1000 | 210 | 380 | 406 | 330 | 38 | PAN | 5000 | 230 |
| Comparative example 6 | aluminum alloy A6061 | 300 | 350 | 70 | 100 | 406 | 391.2 | 7.4 | PAN | 5000 | 230 |
| Comparative example 7 | aluminum alloy A6061 | 300 | 350 | 70 | 100 | 406 | 391.2 | 7.4 | pitch | 3600 | 620 |
| Example 7 | SCM435 | 850 | 1000 | 210 | 380 | 406 | 330 | 38 | pitch | 3600 | 620 |
| Comparative example 8 | SCM435 | 850 | 1000 | 210 | 380 | 406 | 330 | 38 | PAN | 5000 | 230 |

| Remarks | Carbon fiber reinforced plastic layer Thickness/ mm | Storage tank type | Auto-frettage/ MPa | Hydrogen pressure/ MPa | Generated stress of liner/ MPa | Design factor | Fracture results at 100,000 times/ number of cycle | Weight of carbon fiber for every 1,000 mm of length of hydrogen storage tank cylindrical portion/kg |
|---|---|---|---|---|---|---|---|---|
| Example 1 | 60 | type2 | none | 82 | 250 | 4 | none | 186 |
| Example 2 | 48 | type2 | none | 82 | 250 | 4 | none | 144 |
| Example 3 | 79 | type3 | none | 82 | 200 | 4 | none | 252 |
| Example 4 | 56 | type2 | none | 82 | 250 | 4 | none | 172 |
| Example 5 | 56 | type2 | none | 82 | 400 | 2.5 | none | 172 |
| Example 6 | 60 | type2 | 210 | 82 | 200 | 4 | none | 186 |
| Comparative example 1 | 163 | type2 | none | 82 | 250 | 4 | none | 612 |
| Comparative example 2 | 212 | type2 | none | 82 | 200 | 4 | none | 869 |
| Comparative example 3 | 252 | type2 | none | 82 | 235 | 4 | none | 1093 |
| Comparative example 4 | 109 | type3 | 166 | 82 | 155 | 2.25 | leakage at 25,000 times | 372 |
| Comparative example 5 | 64.2 | type2 | 210 | 82 | 500 | 2 | leakage at 50,000 times | 200 |
| Comparative example 6 | 221 | type3 | 166 | 82 | 87.5 | 4 | leakage at 80,000 times | 914 |
| Comparative example 7 | 82 | type3 | 166 | 82 | 87.5 | 4 | leakage at 80,000 times | 264 |
| Example 7 | 50 | type3 | 210 | 82 | 250 | 4 | none | 186 |
| Comparative example 8 | 64.2 | type3 | 210 | 82 | 500 | 2 | leakage at 50,000 times | 200 |

Fatigue limit at hydrogen pressure of 82 MPa: stress of round bar specimen cut from liner raw material. parallel portion diameter 6 mm, hydrogen pressure: 82 MPa, stress ratio: 0.1, number of cycles: 100,000 times In Table 1, Examples 1, 2, 3, 6, and 7 and Comparative examples 1, 2, 5, and 8 used the chrome molybdenum steel (SCM435), which was a low-alloy steel, for the liner layer 12, and Examples 4 and 5 used the nickel-chrome-molybdenum steel (SNCM439), which was a low-alloy steel. Also, Comparative example 3 used the 34CrMo44 steel described in Japanese Unexamined Patent Application Publication No. 2009-293799 for the liner layer 12. Comparative examples 4, 6, and 7 used the aluminum alloy (A6061) for the liner layer 12. In this regard, the basic performance to be satisfied by the hydrogen storage tank 10 was on the basis of presence or absence of fracture at pressure and decompression cycles of 100,000 times, where the pressure in the hydrogen storage tank 10 after filling was 82 MPa. Also, from the viewpoint of the cost, the reference value of the weight of the carbon fiber for every 1,000 mm of the length of cylindrical portion of the hydrogen storage tank 10 was specified to be 500 kg, and the carbon fiber having the value of 500 kg or less was evaluated as good.

As is clear from Examples 1 and 2 versus Comparative example 1 and Example 3 versus Comparative example 2, in the case where the above-described predetermined strength and stiffness property were satisfied by using the identical liner layer 12, the thickness and the weight when the pitch based carbon fiber was used for the carbon fiber reinforced plastic layer 14 were able to be reduced to about one-third of those when the PAN based carbon fiber was used. Also, the weight of the carbon fiber for every 1,000 mm of the length of cylindrical portion of the hydrogen storage tank 10 was allowed to become 500 kg or less. In addition, it was found that there was substantially no difference between the thickness and the weight of the carbon fiber reinforced plastic layer 14 in Example 1 and those in Example 4 even though the materials for the liner layer 12, chrome molybdenum steel (SCM435) and nickel-chrome-molybdenum steel (SNCM439), were different from each other. Also, as shown in Example 5, good characteristics were obtained by combining the carbon fiber reinforced plastic layer 14 by using the pitch based carbon fiber and the liner layer 12 formed from the nickel-chrome-molybdenum steel (SNCM439). As is clear from comparisons between Example 3 and Example 6 and between Example 1 and Example 7, even in the case where the generated stresses of the liners were set to be the same, the thickness of the carbon fiber reinforced plastic layer 14 was able to be reduced by performing the auto-frettage. On the other hand, in Comparative example 5 and Comparative example 8 in which the PAN based carbon fiber was used for the carbon fiber reinforced plastic layer 14 and SCM435 was used as the material for the liner layer 12, fracture occurred at 50,000 times in spite of auto-frettage. Therefore, it was found that there was no effect of auto-frettage. Also, as is clear from comparison between Comparative example 6 in which the PAN based carbon fiber was used for the carbon fiber reinforced plastic layer 14 and the aluminum alloy was used as the material for the liner layer 12 and Comparative example 7 in which the pitch based carbon fiber was used for the carbon fiber reinforced plastic layer 14 and the aluminum alloy was used as the material for the liner layer 12, the design factors were the same and there was no difference in the number at which fracture occurred, so that there was no effect of the pitch based carbon fiber. That is, only in the case where the pitch based carbon fiber and the low-alloy steel liner were used in combination, a considerable effect of auto-frettage was exerted and the storage tank life was improved by leaps and bounds.

Meanwhile, as shown in Comparative example 3, even in the case where the steel product disclosed in Patent Literature 3 is used for the liner layer 12, when the PAN based carbon fiber was used, in order to specify the design factor of the generated stress of the liner to be 4, it was not possible to specify the weight of the carbon fiber for every 1,000 mm of the length of cylindrical portion of the hydrogen storage tank 10 to be 500 kg or less. Also, Comparative example 4 shows a hydrogen storage tank 10 produced on the basis of the configuration, which has been previously known as the configuration for the on-board hydrogen tank. As shown in Comparative example 4, in the case where the aluminum alloy was used for the liner layer 12 and the previously employed PAN based carbon fiber was used for the carbon fiber reinforced plastic layer 14, although the thickness of the carbon fiber reinforced plastic layer 14 was considerably large as compared with the thickness in the present invention example, the generated stress of the liner (155 MPa) determined by calculation exceeded "fatigue limit at hydrogen pressure of 82 MPa" (fatigue fracture critical stress) (100 MPa), so that leakage occurred actually in 100,000 times of pressure and decompression cycle test. Also, as shown in Comparative example 5, a hydrogen storage tank was produced by using the same steel liner as that in Example 1 and the PAN based carbon fiber. The generated stress of the liner (500 GPa) determined by calculation exceeded "fatigue limit at hydrogen pressure of 82 MPa" (fatigue fracture critical stress) (380 GPa), so that leakage occurred actually in 100,000 times of pressure and decompression cycle test.

In addition, as is clear from the present example, the fatigue fracture critical stress of the liner layer, where the number of cycles was 100,000 times at the hydrogen pressure of 82 MPa, was more preferably 250 MPa or more. Moreover, in the case where the fatigue fracture critical stress of the liner layer was 400 MPa or more, the design factor can be specified to be 2.5 or less, so that the cost was able to be further reduced more preferably.

As described above, a lightweight inexpensive hydrogen storage tank 10 can be provided while the requirements for both the strength (burst) of the storage tank to store hydrogen and the fatigue strength against pressure and decompression cycles are satisfied by interaction between the liner layer 12 formed from the low alloy steel and the carbon fiber reinforced plastic layer 14 formed from the pitch based carbon fiber.

REFERENCE SIGNS LIST 1 hydrogen-filling station, 2 curdle, 3 compressor, dispenser, 5, 6a, 6b pipe, 7 hydrogen tank, 8 valve, hydrogen storage tank, 10a cylindrical portion, 10b shoulder, 10c, 10d hole, 12 liner layer, 12a outer circumference surface, 14 carbon fiber reinforced plastic layer, 16 coating, 20 valve, 21 boss, 30 seamless steel tube, S1 internal space, φ1 outside diameter, φ2 inside diameter

The invention claimed is:

1. A hydrogen storage tank to store hydrogen, the hydrogen storage tank comprising a hollow tube having a liner layer and a carbon fiber reinforced plastic layer disposed on the outside of the liner layer,
  wherein the liner layer is formed from a low-alloy steel, the low-alloy steel comprising any one of a chrome molybdenum steel, a nickel-chrome-molybdenum steel, a manganese chrome steel, a manganese steel, and a boron-added steel,
  the carbon fiber reinforced plastic layer is formed from mesophase pitch based carbon fibers and a thermosetting resin, the pitch based carbon fibers having a stiffness property larger than the stiffness property of the low-alloy steel, the pitch based carbon fibers wound around the liner layer such that an elongation of the pitch based carbon fibers is 1% or less,
  the liner layer has a tensile strength of 800 to 1000 MPa and a thickness of 20 to 60 mm,
  the carbon fiber reinforced plastic layer has a thickness of 48 to 79 mm,
  a volume content of the pitch based carbon fibers in the carbon fiber reinforced plastic layer is in a range of 50% to 80%, and
  a Young's modulus of the pitch based carbon fibers is in a range of from 400 to 1,000 GPa.

2. The hydrogen storage tank according to claim 1, wherein the generated stress of the liner layer is designed to be less than or equal to the fatigue fracture critical stress, where the number of cycles is 100,000 times at the hydrogen pressure at which the hydrogen storage tank is used.

3. The hydrogen storage tank according to claim 1, wherein the fatigue fracture critical stress of the liner layer is 250 MPa or more, where the number of cycles is 100,000 times at the hydrogen pressure of 82 MPa.

4. The hydrogen storage tank according to claim 1, wherein the liner layer is subjected to auto-frettage.

5. The hydrogen storage tank according to claim 1, wherein the liner layer is formed from a seamless steel tube produced by piercing a high-temperature material during rolling.

6. The hydrogen storage tank according to claim 5, wherein the generated stress of the liner layer is designed to be less than or equal to the fatigue fracture critical stress, where the number of cycles is 100,000 times at the hydrogen pressure at which the hydrogen storage tank is used.

7. The hydrogen storage tank according to claim 1, wherein the outer circumference surface of the liner layer is subjected to powder coating.

* * * * *